(12) United States Patent
Hoppe et al.

(10) Patent No.: US 6,575,371 B1
(45) Date of Patent: Jun. 10, 2003

(54) INJECTION-MOULDED CARD WITH DECORATIVE LAYER

(75) Inventors: Joachim Hoppe, Munich (DE); Wolfgang Gauch, Otterfing (DE)

(73) Assignee: Giesecke & Devrient GmbH (DE)

( * ) Notice: Subject to any disclaimer, the term of this patent is extended or adjusted under 35 U.S.C. 154(b) by 0 days.

(21) Appl. No.: 09/423,647

(22) PCT Filed: May 18, 1998

(86) PCT No.: PCT/EP98/02943

§ 371 (c)(1),
(2), (4) Date: Feb. 11, 2000

(87) PCT Pub. No.: WO98/52731

PCT Pub. Date: Nov. 26, 1998

(30) Foreign Application Priority Data

May 20, 1997 (DE) .......................................... 197 21 058

(51) Int. Cl.[7] .............................................. G06K 19/02
(52) U.S. Cl. ...................... 235/488; 235/457; 235/487; 235/492
(58) Field of Search .................... 235/488, 375; 283/69, 86, 91; 902/25

(56) References Cited

U.S. PATENT DOCUMENTS

| | | | |
|---|---|---|---|
| 4,736,966 A | * | 4/1988 | Haddock et al. ............... 283/69 |
| 4,868,373 A | * | 9/1989 | Opheij et al. ................ 235/380 |
| 4,994,659 A | * | 2/1991 | Yabe et al. .................. 235/488 |
| 5,033,774 A | * | 7/1991 | Benardelli .................... 206/82 |
| 5,083,850 A | * | 1/1992 | Mallik et al. .................. 359/1 |
| 5,138,604 A | * | 8/1992 | Umedat et al. ............. 235/457 |
| 5,198,652 A | * | 3/1993 | Rose .......................... 235/488 |
| 5,244,840 A | * | 9/1993 | Kodai et al. ................ 235/492 |
| 5,567,362 A | * | 10/1996 | Gr un ........................ 264/1.31 |
| 5,760,961 A | * | 6/1998 | Tompkin et al. ............. 359/576 |
| 5,763,868 A | * | 6/1998 | Kubota et al. .............. 235/487 |
| 5,888,624 A | * | 3/1999 | Haghiri et al. .............. 235/488 |
| 6,090,471 A | * | 7/2000 | Abrams ........................ 283/81 |

* cited by examiner

Primary Examiner—Michael G. Lee
Assistant Examiner—Ahshik Kim
(74) Attorney, Agent, or Firm—Bacon & Thomas, PLLC

(57) ABSTRACT

The invention relates to a method for producing injection-molded cards with at least one decorative layer (2, 6) which is already applied to a foil (1, 7) or an inlay before injection molding. To protect the inks used for the decoration from thermal action and/or excessive pressures and/or high mechanical stress during injection molding, the decorative layer (2, 6) is covered according to the invention with a protective layer (3, 5) before the foil (1, 7) provided with the decoration or an inlay provided with a decoration is inserted into the injection mold.

12 Claims, 1 Drawing Sheet

INJECTION-MOULDED CARD WITH DECORATIVE LAYER

BACKGROUND OF THE PRESENT INVENTION

This invention relates to a method for producing an injection-molded card with a decorative layer, in particular a credit card, check card, bank card, ID card, telephone card and the like, according to the preamble of claim 1, and to an injection-molded card produced by said method.

A number of methods are known for providing an injection-molded card with a decorative layer. An especially simple method is to apply the decorative layer by printing technology to a card blank produced by injection molding. One disadvantage of this procedure, however, is that single cards are printed, which is relatively elaborate and expensive. Further, it is very difficult to produce a high-quality, i.e. for example high-gloss, card surface with this technique. A further disadvantage is that the decorative layer is applied as the outermost layer and can thus be damaged relatively easily. This can be prevented for example by covering the card with transparent lacquer, but this makes the method even more expensive.

The method known from EP 0 350 179 B1 largely eliminates the stated disadvantages. According to this method the decorative layer is applied to the card body in the form of printed labels. In this method the card can be provided with a decorative layer on both sides by inserting two labels into a mold in such a way that the labels lie against the inner sides of the mold, the printed sides of the labels facing inwardly. Subsequently a reaction-injection-moldable plastic material is injected between the labels. After the plastic material hardens one can remove the finished card bearing the labels on its two main faces from the mold.

However, the method described in EP 0 350 179 B1 can only be used in conjunction with reaction-injection-moldable plastic material, whereby the pressures and temperatures that occur are considerably below the values of conventional injection molding methods. This means that the spectrum of usable materials is restricted to a few reaction-injection-moldable plastics. If one used the card labels known from EP 0 350 179 B1 with conventional injection molding technology, the decoration applied by printing technology would be damaged during the injection molding process as a result of the high temperatures and pressures that occur.

The invention is therefore based on the problem of stating a method for producing an injection-molded card with a high-quality decorative layer and an accordingly produced injection-molded card.

SUMMARY OF THE INVENTION

This problem is solved by the characterizing features of the present invention. Advantageous embodiments of the present invention further improve over known methods.

According to a preferred embodiment of the invention, at least one carrier layer provided with a decorative layer is introduced into the injection mold. To protect the printed image from damage by the injected injection molding material, the printed image is covered with a protective layer which prevents direct contact between the printed image and the injection molding material. For this purpose the carrier layer is inserted into the injection mold in such a way that the protective layer does not lie against the wall of the injection mold, i.e. the injection molding material is injected against the printed side of the carrier layer. This makes it possible to produce high-quality labels simply, for example by sheet printing, and provide them with a protective layer and subsequently process them into high-quality cards using conventional injection molding. The inventive method thus has the advantage of using efficient and cost-effective standard techniques while nevertheless producing a very high-quality product.

The inventive method makes it possible to provide the card with a high-quality decoration on one or both sides without great additional expense and without having to accept a restricted choice of injection-moldable plastics or restricted choice of inks for the decoration. The protective layer also makes it possible to incorporate photos, holograms, etc., as a decorative layer.

According to an advantageous embodiment of the invention, the protective layer is made of a material which increases the adhesion of the label to the injection-molded body. This attains an additional improvement in the durability of the card.

Further, the protective layer can also be provided with pigments or dyes in order to provide a uniform, colored background for the printed image for example. This also makes it possible to produce inscription properties, such as laserings, or to graphically design the protective layer itself, for example by producing dulling effects, logos, writing or the like by blind embossings.

Finally, it is also possible to incorporate feature substances in the protective layer which can be used in connection with the authenticity testing of the card. Security features incorporated in the card in this way are comparatively hard to forge since they are not disposed directly on the surface.

In particular with chip cards or similar cards it is advantageous to provide the coated foil with a gap into which a dummy having the shape of a later incorporated IC module is inserted during injection molding.

A further advantageous development of the inventive method provides that the carrier layer consists of a transparent foil. This foil is placed with the uncoated main face against the wall of the injection mold. The decoration and the protective layer are thus directed inwardly within the injection mold. The protective layer prevents the decoration from being impaired by the injection molding process.

If a transparent injection molding material is used, the decoration can also be printed on one or both sides of an inside layer of the card. The printed inlay is in this case also provided with a protective layer which protects the decoration from high temperatures and pressures and high mechanical stress during injection molding.

BRIEF DESCRIPTION OF THE DRAWINGS

The invention will be explained below with reference to the embodiments shown in the figures, in which.

DETAILED DESCRIPTION OF THE PRESENT INVENTION

Figure 1:
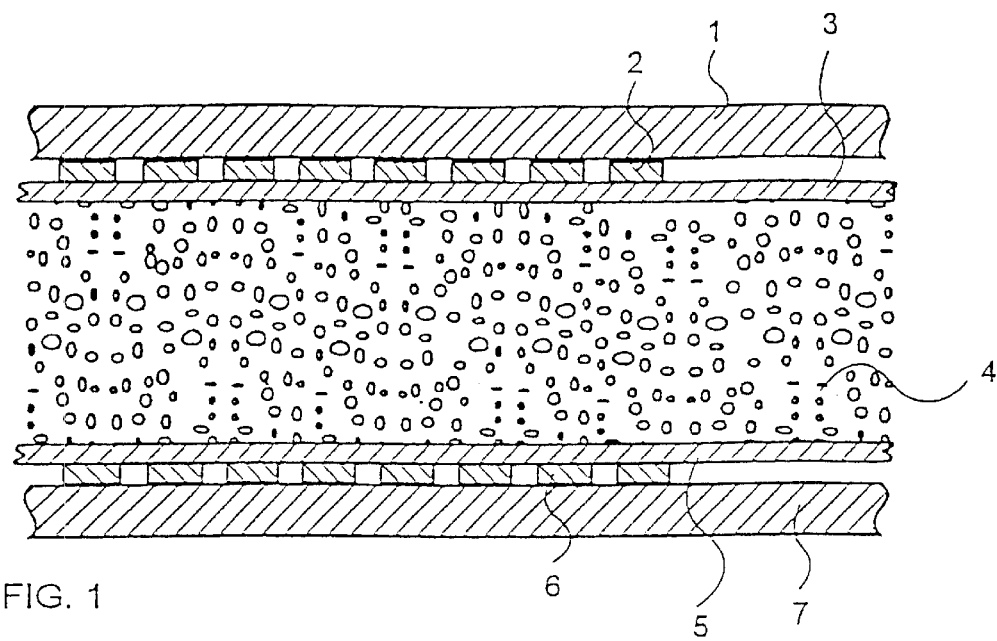
FIG. 1 shows an injection-molded card with labels disposed on both sides.

FIG. 1 shows an injection-molded card consisting of injection-molded card body 4 surrounded on both sides by labels 1, 2, 3 and 5, 6, 7, respectively. The labels consist of transparent foil 1, 7, decoration 2, 6 preferably applied to said foil by printing technology, and protective layer 3, 5.

During production of such a card the labels are first produced in the known fashion. For this purpose the decorative layer is applied to the transparent foil in an external production step. For protection of the decorative layer the latter is subsequently coated with a protective layer. Said protective layer is to protect the decorative layer from excessive pressures or excessive thermal or mechanical load in the later injection molding process so as to avoid any restriction in the use of decorative inks, for example to thermostable inks, or in the use of the injection molding material to reaction-injection-moldable plastics.

The printed labels are preferably punched out of large sheets. The thus produced labels are each inserted into the injection mold in such a way that the unprinted side of transparent foil 1, 7 lies against the injection mold. Decoration 2, 6 printed on the foil and covered by protective layer 3, 5 is consequently located on the inner side. After the injection mold is closed the injection molding material is then injected against the protective layer, whereby the protective layer prevents impairment of the decoration.

The material used for the protective layer is executed for example in the form of a foil or lacquer layer. A suitable lacquer layer is in particular a one- or multi-component screen printing lacquer or UV-curing offset lacquer. The protective layer can perform further functions besides protecting the decoration. For example the material can be selected so as to also increase the adhesion of the label to the injection-molded body. Further, the protective layer can contain pigments or dyes which can serve as the background color for the decoration, or one can incorporate feature substances into the protective layer which are used for authenticity testing.

The injection-molded card shown in FIG. 1, without restricting the universality, shows labels disposed on both sides of the injection-molded layer. It is likewise conceivable to dispose labels on only one side or only on part of the surface.

Figure 2:
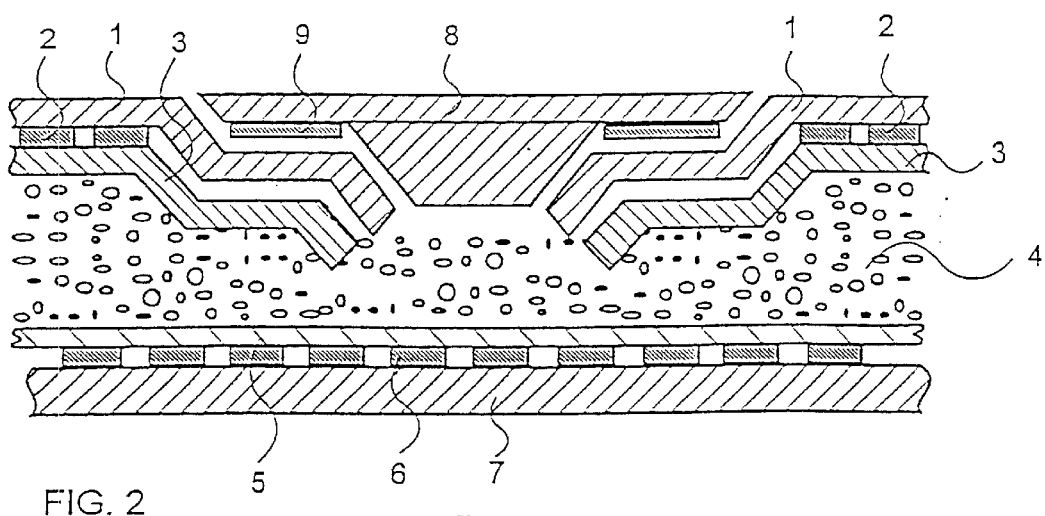
FIG. 2 shows an injection-molded card with labels disposed on both sides and an IC module.

FIG. 2 shows an embodiment of the invention which contains a chip module. This embodiment corresponds substantially to that of FIG. 1 and contains first transparent foil 1 printed with decoration 2 covered by protective layer 3. Second transparent foil 7 printed with decoration 6 is likewise disposed on the opposite side of injection-molded body 4, this decoration also being covered by protective layer 5. Further, in the embodiment of FIG. 2 chip module 8 is incorporated in the card, being fastened to transparent foil 1 by adhesion promoter 9.

For producing a card according to FIG. 2, first label 1, 2, 3 is provided with an opening having for example a smaller dimension than chip module 8. In this case a die in the form of chip module 8 to be incorporated is impressed in a first step after injection of the injection molding compound, for example, and subsequently module 8 is introduced into the thus produced cavity. Promoter 9, preferably a layer of hot-melt adhesive material which is activated by the residual heat of injection-molded card body 4 or foil 9, connects module 8 with foil 1.

The opening in first label 1, 2, 3 is selected to be big enough to reliably prevent the label from tearing when the die is impressed or the module inserted.

Alternatively, the opening in the label can also be selected to be big enough to correspond to the outer dimensions of the chip module so that no deformation of the label arises when the die is impressed or the module inserted. In this case the chip module is applied directly to the injection molding compound so that suitable adhesion promoter 9 must also be used.

It is likewise conceivable to already introduce the module into the mold during injection molding so that no further working step is required for incorporating the chip module in the card.

Figure 3:
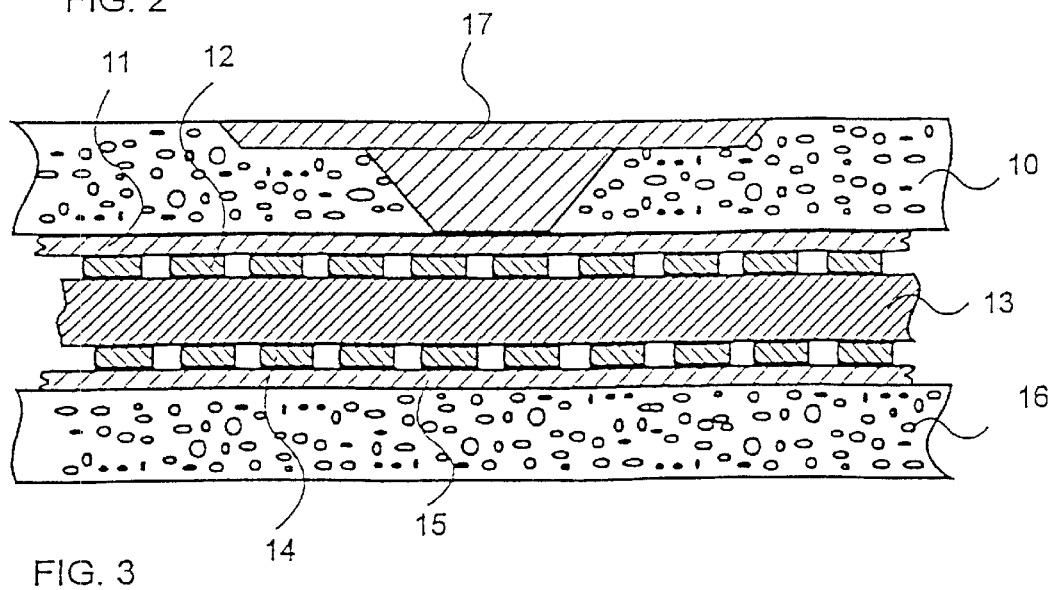
FIG. 3 shows an injection-molded card with a printed inlay.

FIG. 3 shows by way of example an injection-molded card wherein inlay 13 provided on both sides with decoration 12, 14 and made for example of paper or foil and covered on both sides with protective layer 11, 15 is surrounded by injection molding compound 10, 16. Chip module 17 is disposed in the area of upper injection-molded layer 10.

For producing a card according to FIG. 3, inlay 13 is first produced by known methods. The thus produced inlay is provided with the decorative layer. In this case any restrictions with respect to the inks to be used also exist only with respect to the material used for inlay 13. Protective layer 11, 15 is then applied to decorative layer 12, 14. The inlay with decorative and protective layers is preferably produced in sheets out of which the individual inlays are punched.

The inlay with decorative and protective layers is inserted in the middle of the injection mold. Subsequently, injection molding compound 10, 16 is injected into the mold on both sides. For insertion of the inlay in the injection mold the inlay is preferably given dimensions which are greater than the dimensions of the finished card so that upon insertion in the mold an edge is left on which the inlay can be fixed.

In the embodiment according to FIG. 3 one uses injection molding material which is transparent at least in the cooled, cured state..

Both in the embodiment according to FIG. 2 and in the embodiment according to FIG. 3 the injection mold can have a plurality of mold cavities so that a plurality of injection-molded cards can be produced simultaneously. Foil 1, 7 or inlay 13 can be present as a band or sheet and be inserted into a plurality of mold cavities simultaneously. In this case the single cards are punched out when, or after, being removed from the mold. It is likewise possible to insert one foil 1, 7 or one inlay 13 in each mold cavity.

What is claimed is:

1. A method for producing an injection-molded card with at least one decorative layer, the decorative layer having opposed first and second surfaces such that the first face of the decorative layer is applied to a surface of a carrier layer to define together a card inlay having opposed first and second faces, said method comprising the steps of:

covering the second face of the decorative layer with a protective layer, the second face of the card inlay being defined by the second surface of the decorative layer;

positioning the card inlay carrying the protective layer into an injection mold having a cavity with opposed walls, the card inlay being positioned in the mold such that the first face of the card inlay is held against one of the cavity walls and the second face of the card inlay with the protective layer applied thereon is not positioned against a wall of the cavity and is thereby exposed to the cavity of the mold;

closing the injection mold;

injecting a molding compound into the injection mold cavity to form an injection-molded card body therewith, said protective layer adhering to the molding compound as the molding compound is formed into the card body; and removing a single-body, injection-molded card including the card body, the protective layer and the card inlay from the injection mold, the card body and the card inlay being integrated together with the protective layer embedded therebetween in the injection-molded card.

2. The method according to claim 1, wherein the protective layer comprises a material that increases the adhesion of the injection molding compound to the carrier layer.

3. The method according to claim 1, wherein the protective layer contains pigments or dyes.

4. The method according to claim 1, including incorporating feature substances for authenticity testing in the protective layer.

5. The method according to claim 1, including applying at least one protective lacquer layer to the decorative layer.

6. The method according to claim 1, including applying a protective foil layer to the decorative layer.

7. The method according to claim 1, wherein the carrier layer comprises a transparent foil that is inserted into the injection mold in such a way that an uncoated side of the transparent foil lies against the mold cavity.

8. The method according to claim 7, wherein the coated foil includes a gap and including the step of inserting a chip module in the gap.

9. The method according to claim 1, wherein the protective layer is transparent.

10. A single-body, injection-molded card comprising a card body formed from a molding compound during an injection molding process, at least one decorative layer, a protective layer covering a first side of said decorative layer and a carrier layer adhered to a second side of said decorative layer opposite to the first side, said decorative and carrier layers defining a card inlay with the decorative layer disposed along a first side thereof;

wherein the protective layer defines an interface between the molding compound and the card inlay during the injection molding process such that the molding compound is injected over the protective layer, the card body and the card inlay being integrated together with the protective layer embedded therebetween in the injection-molded card.

11. The injection-molded card as claimed in claim 10, wherein the carrier layer comprises a transparent material that is disposed on one or both main faces of the injection-molded card body.

12. The injection-molded card according to claim 10, wherein the carrier layer is formed as a card inlay which is provided on one or both sides with a decorative layer and wherein the injection-molded card body is transparent.

* * * * *